Aug. 10, 1948. W. C. DE VRY 2,446,576
FILM SPLICER
Filed Feb. 27, 1943 2 Sheets-Sheet 1
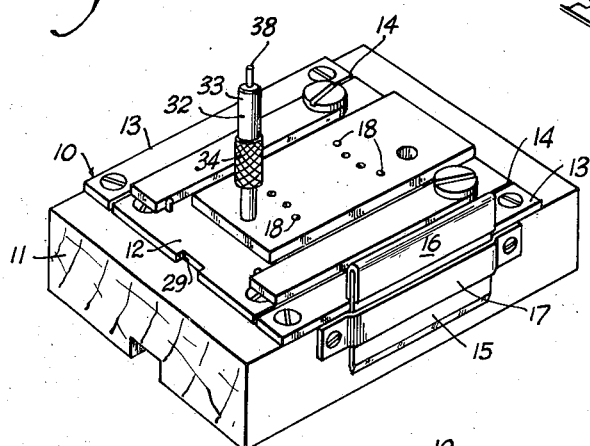
William C. De Vry
INVENTOR.
BY Clarence E. Threedy
HIS ATTORNEY.

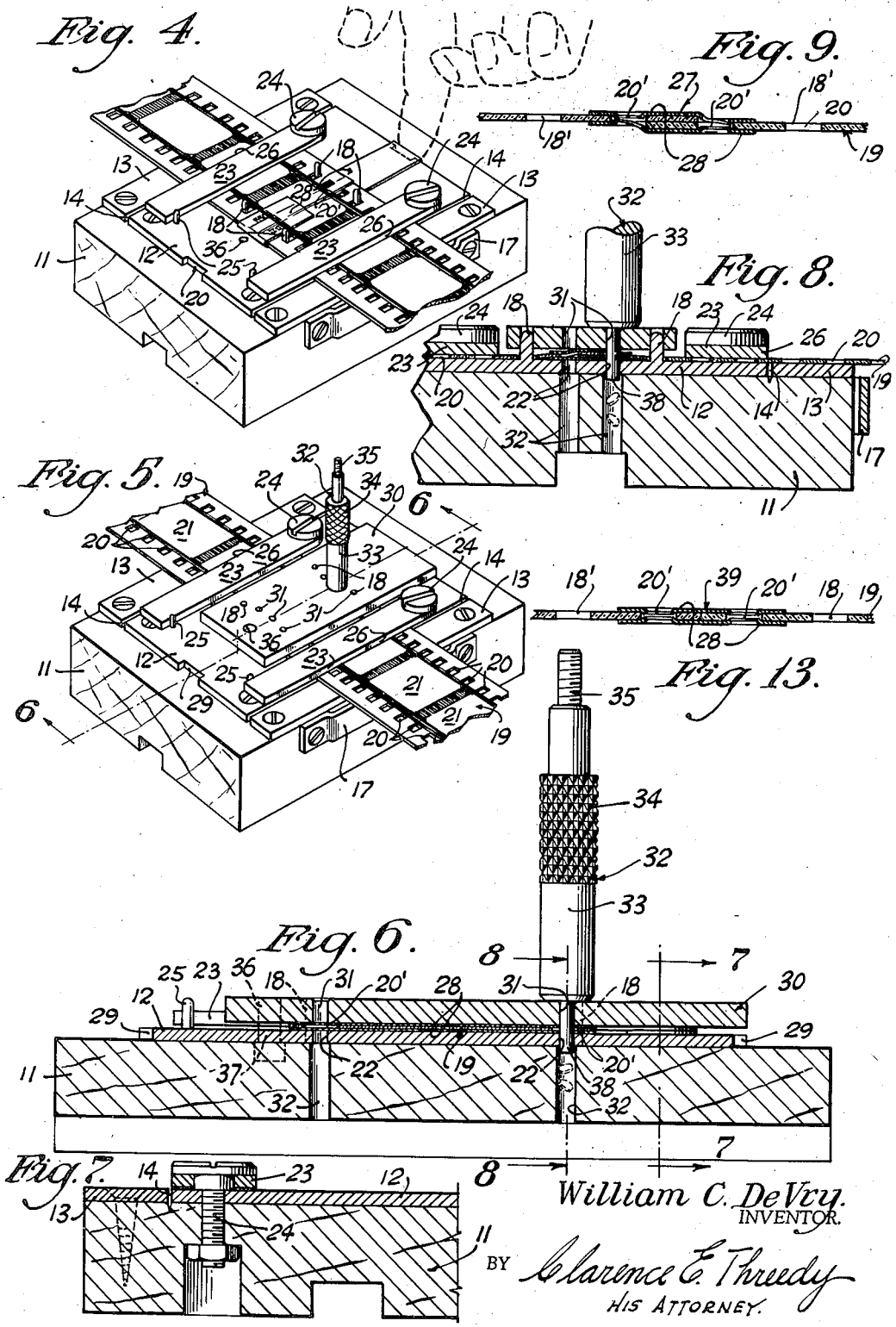

Patented Aug. 10, 1948

2,446,576

UNITED STATES PATENT OFFICE 2,446,576

FILM SPLICER

William C. De Vry, Chicago, Ill., assignor to De Vry Corporation, Chicago, Ill., a corporation of Illinois Application February 27, 1943, Serial No. 477,387

6 Claims. (Cl. 154—42.1)

This invention relates to the splicing of a transparent web or film and has as its principal object simplicity of construction, economy in manufacture and efficiency in use.

Another object of my invention is to provide an article of manufacture in the form of a film splicing kit.

Still another object of this invention is to provide in a film splicing apparatus a novel clamping, gauging and shearing guide for the preparation of transparent film for splicing.

Yet another object of this invention is to provide a die for the splicing of film by means of a transparent adhesive strip and for registering and perforating certain conveyor tracks in the spliced joint so made.

A further object of this invention is to provide a novel means of joining loose ends of a photographic web with adhesive tape without necessitating the removal of emulsion from such web.

A still further object of this invention is to provide a method of splicing motion picture film by the application of a transparent mending medium.

Other objects will appear more fully hereinafter.

The invention consists in the novel combination and arrangement of parts to be hereinafter described and claimed.

The invention will be best understood by reference to the accompanying drawings showing the application of my invention, and in which:

Fig. 1 is a perspective view of my new film splicing kit;

Fig. 2 is a perspective view of the same in condition for trimming film;

Fig. 3 is a perspective view of the same showing film about to be assembled for splicing;

Fig. 4 is a perspective view similar to that of Fig. 3 showing completion of a splice;

Fig. 5 is a perspective view of the same illustrating the final and perforating operation;

Fig. 6 is a sectional view taken along line 6—6 in Fig. 5;

Fig. 7 is a fragmentary sectional view as seen from line 7—7 in Fig. 6;

Fig. 8 is another sectional view similar to that of Fig. 6 and taken substantially along line 8—8 thereof;

Fig. 9 is a sectional detail view through a lap joint of the transparent web as completed by the foregoing splicing kit;

Fig. 10 is a perspective view of a section of broken film about to be trimmed for splicing;

Fig. 11 is a fragmentary perspective view of the method of employing the splicer for making an abutting joint;

Fig. 12 is a perspective view of the joint resulting from the steps from Figs. 10 and 11 to Fig. 12; and Fig. 13 is a sectional detail view through the abutting joint with the sprocket engaging apertures perforated and ready for use.

Referring to the drawings, particularly Fig. 1, there is shown a film splicing kit 10 which comprises a base member 11, preferably made of wood, and having a flat upper surface upon the mid region of which lies a die plate 12 which is secured to the base member. Likewise mounted on the base member 11 and spaced slightly from the die plate are companion plates 13 which cooperate with the die plate to form a slit 14 for guiding a cutting blade 15 in the manner shown in Fig. 2. The cutting blade 15 is formed as a part of a razor blade 16 and is normally stored in a sheath 17 on one side wall of the base member 11 when the splicing kit is not in use.

Means for gauging and registering the transparent film to be worked upon are provided in the form of spaced pins 18 extending upwardly from the die plate 12. The film to be spliced comprises a transparent web 19 having the usual sprocket apertures 20 along its edge and bearing subject matter such as the usual frame 21 consisting of a fixed emulsion producing a picture to be projected or sound track or both. The best example of such transparent web is conventional motion picture film of the 35 mm. class, it being obvious, however, that the application of my invention is equally suited for the splicing of 16 mm. and 8 mm. film as well as microfilm.

As shown in Fig. 2, each frame 21 of the film 19 extends a distance equal to the spacing of a predetermined number of sprocket apertures 20 and in this particular instance there are four apertures 20 in the space spanned by one frame 21. A torn section of film 19 is placed on the die plate 12 with the last whole frame 21 centered on the die 12 and the pins 18 projecting through the four apertures 18' disposed at the corners of the frame 21. In the drawings the center C of each frame 21 is marked along the edge of the film 19 and such center mark C is disposed between the two intermediate apertures 20' which are arranged over die formations 22 in the die plate 12. In this position the jagged edge of the film extends over the companion plate 13 above the slit 14. A pair of cutting guides 23 are pivoted as at 24 on the two respective sides of the die plate 12 adjacent the slits 14 and are normally disposed against stop pins 25 on the plate 12 to provide shear guiding edges 26 above the slits 14. The cutting blade 15 is adapted to be guided along the edge 26 and slit 14 to shear the film 19.

The arrangement is such as to dispose the shear guiding edge 26 at a predetermined position with respect to the center C of the frame 21 centered on the die plate 12 whereby to trim the jagged edge at a desired point to accomplish a perfect splice.

In the preferred embodiment a lap joint 27 is contemplated (see Figs. 4 and 9) and this lap joint 27 is made by cutting the jagged edge away as aforesaid at a predetermined point across the film 19. The cut is made at a plane aligned with the innermost margin of the aperture 20' leaving that portion of the film between the two intermediate apertures 20' at the trimmed edge. This operation is repeated for the opposite jagged edge of film, thus cutting away the equivalent of one frame and leaving the remaining halves 19' of the endmost frames for splicing.

To accomplish the splice I prefer to use a transparent gelatinized cellulosic material such, for example, as the mending ribbon commonly known as "Scotch tape," a strip of which is indicated at 28. This tape has a hard glazed finish on one face thereof and is tacky and adhesive on the opposite face. However, the tape 28 does not necessarily have to be transparent since the relative speed at which the film will travel past a projection aperture is so great that an opaque exposure would not be noticeable. As shown in Fig. 3, a length of this tape is laid across the die plate 12 along the long axis thereof with its adhesive face up and is trimmed at each end by drawing the blade 15 along the endmost edges of the die plate 12. The two trimmed ends of the film 19 are then arranged on the die plate 12 with the apertures 18' disposed over the pins 18 and the trimmed edge of each remaining half 19' of the endmost frame aligned with the innermost margin of the apertures 20' as shown in Fig. 4.

Each endmost edge of the die plate 12 is recessed as at 29 to facilitate the grasping of the free ends of the tape 28. Having thus laid the two trimmed ends of the film 19 in overlapping condition and the cutting guides 23 being swung against their respective stops 25 to hold the two ends to be joined in alignment and flush upon the upper face of the die plate 12, the free ends of the tape 28 are folded back upon the film as shown. It will be noted that the distance between the side edges of the film 19 and their respective endmost edge of the die plate 12 is substantially one-half the width of the film 19 so that when the two free ends of the tape 28 are folded as aforesaid they will abut at the longitudinal center of the film. The foregoing procedure may be altered by first placing the film ends to be joined on the pins 18' and swinging the cutting guides 23 over the film to hold the two sections thereof in place and then applying the tape 28 to the upper surface of the joined film and subsequently folding the ends of the tape around the film.

It is important to note that this invention does not require that the emulsion be removed from the film as is necessary and essential to the successful carrying forward of prior known methods of splicing film. The tape 28 surrounding the entire section of films where the two trimmed ends are overlapped, is pressed down firmly to expel all air from beneath the tape, thus securing the two. The centermost apertures 20' being covered by the tape as shown in Fig. 4, it becomes necessary to perforate the tape to complete the splice so that the film 19 will operate in the manner intended with sprocket means (not shown), or it is contemplated that the width of the tape 28 may be narrow enough to fit between two sprocket apertures thus eliminating the necessity of perforation.

The perforating operation is shown in Figs. 5, 6 and 8 and employs an auxiliary die plate 30 having holes 31 drilled therethrough in a pattern coincident with the position of the pins 18 and the intermediate apertures 20' with respect thereto. This auxiliary die plate 30 is arranged on the pins 18 in the manner shown in Figs. 5 and 8 whereby to hold the overlapping ends of the film 19 stationary, with the apertures 20' in alignment with the holes 31.

The die plate 12 also has perforations therethrough in the form of the die formations 22 hereinbefore explained and in alignment with the holes 31, thus providing a guide for a punching instrument now to be explained, it being noted that drop-out openings 32 are formed in the base member 11 beneath the die formations 22 to permit exit of the punched-out portions of the tape 28.

As shown in Fig. 1 there is provided a hand tool 32' which comprises a shank 33 having a knurled portion 34 and having a stud screw 35 adapted to extend through an opening 36 formed in the auxiliary die plate 30 and into threadable engagement with a tapped opening 37 formed in the die plate 12 so as to secure the auxiliary die plate on the die plate 12 when the kit 10 is not in use. The opposite end of the shank 33 is a punch 38 which is of a dimension sufficient to slide into the holes 31 toward and into the holes 22 as shown at the right in Figs. 6 and 8. It is obvious that the punch 38 is equally adapted to be forced down into the holes 22 without the guiding action of the auxiliary die 30. To obtain the best results, however, the aligned holes 31—22 act as a supporting die while the punch 38 punctures the two strata of the tape 28 covering the aperture 20'. After all of the apertures 20' are reperforated by the punching operation aforesaid, the auxiliary die plate 30 is removed, the cutting guides 23 swung out to free the film and the newly joined film removed from the die plate 12 for immediate use on the conventional drive mechanism employed in the projection of motion pictures. Thus, I have provided a means and method of quickly splicing torn film in a simple and inexpensive manner without the removal of albumin emulsion and without the application of glue, cement or heat and pressure. A single layer of tape has been found satisfactory in obtaining a stable and lasting splice, and it is desirable in some cases to apply two separate layers of tape each of a length equal to the width of the film 19, thereby eliminating the layer of tape at the side edges of the film.

The splice formed in the manner heretofore explained is shown in cross section in Fig. 9 where it is clearly shown that the portions of the tape 28 extending over the apertures 20' bend inwardly toward each other and that elongated portions as shown in Fig. 6 will adhere to each other, thereby forming a locking rim about the periphery of the aperture 20'.

It is apparent that my method of splicing film and the means for preparing the film and holding the loose ends to be joined, may vary in form and degree without departing from the essence of the invention. In this regard, I have shown a modified form of splice in Figs. 10 to 13 inclusive, which I term an abutting joint 39. In this form of splice the edges of the broken film are trimmed along the center marks C (Fig. 10) the position of the slit 14 and the cutting guides 23 are correspondingly spaced from the die plate 12 to gauge the trimming operation for proper alignment of the newly joined center marks C. The two ends to be joined are laid together in abutting relation as shown in Fig. 11, the tape is then stuck onto the abutting faces, the two ends of the tape being around the film so disposed, to encircle the latter as shown in Fig. 12 and producing a splice as shown in cross section in Fig. 13. The perforations are made through the tape 28 in exactly the same manner as hereinbefore explained concerning the lap joint. It will be noted in this abutting joint (Fig. 13) that the film 19 is not increased in thickness to any great degree as in the case of the lap joint (Fig. 9), thus producing a smoother running splice which will more easily enter the narrow slots in projection mechanisms and which will be more pliable than the overlapping joint.

Attention is directed to the fact that either a lap joint or an abutting joint may be formed at other points with respect to the frame 21; for example, along the space between two frames, thus placing the transparent tape out of the exposed frame 21 entirely.

The various advantages and objects of the invention may be accomplished by modifications of the particular method and embodiment specifically described herein, and it is intended that the appended claims shall include all equivalent arrangements and methods fairly coming within their call.

Having thus described my invention, what I claim as new and desire to protect by Letters Patent is:

1. In a film splicer having a die plate and companion plates spaced therefrom to facilitate the trimming of broken film for splicing, said die plate having die formations therein and upstanding pins spaced therefrom the latter adapted to engage in certain sprocket perforations in the film to locate end portions thereof joined by a strip of adhesive tape in juxtaposition upon said die plate, an auxiliary die plate disposed on said upstanding pins and having punch guiding formations therein for guiding a punch into engagement with the adhesive tape, and a punch coacting with the die formations in said die plate for perforating the adhesive tape to form sprocket perforations therein.

2. In a film splicer having a base member with a die plate thereon and companion plates spaced therefrom to form blade guiding slits, the combination with said die plate of a film registering means adapted to extend through certain perforations in a film to locate end portions thereof joined by a film mending tape in juxtaposition upon said die plate, and means coacting with said film registering means and said die plate for perforating the mending tape covering certain other perforations in the film.

3. In a film splicer having a base member with a die plate thereon and companion plates spaced therefrom to form blade guiding slits, the combination with said die plate of a film registering means adapted to extend through certain perforations in film end portions joined together by a strip of mending tape to locate said joined end portions upon said die plate, and means coacting with said film registering means and said die plate for perforating the mending tape covering certain other perforations in the film, said last named means comprising an ancillary die plate having apertures formed therein adapted to coincide with said film registering means and said certain other perforations in the film and adapted to be arranged on said first named die plate to receive a punching means, and punching means for the purpose aforesaid.

4. A film splicer comprising a base member, film registering means on said base member adapted to coact with certain sprocket apertures formed in the film to properly locate with respect to each other loose end portions of the film to be joined, in position upon said base to be joined together by a strip of transparent adhesive material and to hold upon said base member said end portions joined together by said adhesive material, and means for perforating the strip of adhesive material to provide sprocket apertures therein in alignment with certain sprocket apertures of the film covered by said strip of adhesive material while said end portions joined together by said adhesive material are held upon said base by said film registering means.

5. A film splicer comprising a base member, film registering means on said base member adapted to coact with certain sprocket apertures formed in the film to properly locate with respect to each other loose end portions of the film to be joined, in position upon said base member to be joined together by a strip of transparent adhesive material and to hold upon said base member said end portions joined together by said adhesive material, means for perforating the strip of adhesive material to provide sprocket apertures therein in alignment with certain sprocket apertures of the film covered by said strip of adhesive material while said end portions joined together by said adhesive material are held upon said base by said film registering means, and clamping members movably mounted on said base member for clamping said film on said base member with the film registering means engaging said certain sprocket apertures in the film.

6. A film splicer comprising a die plate, film registering means on said die plate adapted to coact with certain sprocket apertures formed in a film to properly locate upon said die plate end portions of the film to be spliced together by a strip of adhesive material, means for perforating said strip of material to provide sprocket apertures in alignment with such of the sprocket apertures of said film as are covered by said strip of adhesive material, and clamping members pivotally connected to the die plate and adapted to clamp the film thereon, corresponding longitudinal edges of said clamping members being substantially flush with respect to adjacent edges of said die plate, substantially as described.

WILLIAM C. DE VRY.

REFERENCES CITED

The following references are of record in the file of this patent:

UNITED STATES PATENTS

| Number | Name | Date |
|---|---|---|
| 1,467,971 | Wyman | Sept. 11, 1923 |
| 1,490,286 | Miehling | Apr. 15, 1924 |
| 1,502,959 | McNab | July 29, 1924 |
| 1,535,129 | Monacelli et al. | Apr. 28, 1925 |
| 1,591,500 | Tessier | July 6, 1926 |
| 1,730,929 | Flynn | Oct. 8, 1929 |
| 2,027,524 | Fankboner | Jan. 14, 1936 |
| 2,064,414 | Cohn et al. | Dec 15, 1936 |
| 2,241,224 | Stechbart | May 6, 1941 |
| 2,318,287 | Brolin | May 4, 1943 |
| 2,346,874 | Russell | Apr. 18, 1944 |